United States Patent
Richardson et al.

(10) Patent No.: US 10,216,525 B1
(45) Date of Patent: *Feb. 26, 2019

(54) VIRTUAL DISK CAROUSEL

(71) Applicant: American Megatrends, Inc., Norcross, GA (US)

(72) Inventors: Brian Richardson, Loganville, GA (US); Clas Gerhard Sivertsen, Lilburn, GA (US); Charles Patrick Hanes, Hoschton, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/553,117

(22) Filed: Nov. 25, 2014

Related U.S. Application Data

(63) Continuation of application No. 12/814,873, filed on Jun. 14, 2010, now Pat. No. 8,930,666.

(51) Int. Cl.
*G06F 12/00* (2006.01)
*G06F 9/4401* (2018.01)
*G06F 8/61* (2018.01)
*G06F 3/06* (2006.01)

(52) U.S. Cl.
CPC .............. *G06F 9/4406* (2013.01); *G06F 8/61* (2013.01); *G06F 3/0604* (2013.01); *G06F 3/0638* (2013.01); *G06F 3/0662* (2013.01)

(58) Field of Classification Search
CPC .......... G06F 9/4406; G06F 8/61; G06F 3/604; G06F 3/0638; G06F 3/0662
See application file for complete search history.

(56) References Cited

U.S. PATENT DOCUMENTS

| 5,325,377 | A | 6/1994 | Tuttle |
| 5,410,551 | A | 4/1995 | Edwards et al. |
| 5,581,740 | A | 12/1996 | Jones |
| 6,094,531 | A | 7/2000 | Allison et al. |
| 6,178,503 | B1 * | 1/2001 | Madden et al. ................. 713/2 |

(Continued)

OTHER PUBLICATIONS

The 'El Torito' Bootable CD-ROM Format Specification, Version 1.0, Jan. 25, 1995.*

(Continued)

*Primary Examiner* — Kalpit Parikh
(74) *Attorney, Agent, or Firm* — Meunier Carlin & Curfman LLC

(57) ABSTRACT

A virtual disk carousel is provided that is capable of creating disk images from optical disks and storing the disk images. The virtual disk carousel includes a bridge device configured to expose disk images stored at the virtual disk carousel to a computer by way of a standard storage device. When the computer performs read requests on the standard storage device exposed by the bridge device, the bridge device receives the requests from the computer, retrieves the appropriate portion of the disk image from the virtual disk carousel, and provides the portion of the disk image to the computer. The bridge device might also include a display and user input controls for managing the operation of the bridge device. The virtual disk carousel might also provide a user interface for managing the disk images, selecting a disk image to be exposed to the computer, and for performing other functions.

15 Claims, 10 Drawing Sheets

(56) References Cited

U.S. PATENT DOCUMENTS

| | | | |
|---|---|---|---|
| 6,532,538 B1 | 3/2003 | Cronk et al. | |
| 6,543,047 B1 | 4/2003 | Vrhel et al. | |
| 6,618,857 B1 | 9/2003 | Zimniewicz et al. | |
| 6,871,244 B1 | 3/2005 | Cahill et al. | |
| 7,039,836 B2 | 5/2006 | Powers et al. | |
| 7,290,258 B2 | 10/2007 | Steeb et al. | |
| 7,356,677 B1 | 4/2008 | Rafizadeh | |
| 7,467,283 B2 | 12/2008 | Loffink et al. | |
| 7,496,493 B1* | 2/2009 | Stevens | G06F 3/0625 703/24 |
| 7,614,050 B2 | 11/2009 | Sasaki et al. | |
| 2001/0012986 A1 | 8/2001 | Conan et al. | |
| 2004/0098244 A1 | 5/2004 | Dailey et al. | |
| 2004/0117414 A1 | 6/2004 | Braun et al. | |
| 2004/0194084 A1 | 9/2004 | Matsunami et al. | |
| 2004/0210888 A1 | 10/2004 | Bergen et al. | |
| 2004/0267482 A1 | 12/2004 | Robertson et al. | |
| 2005/0114387 A1* | 5/2005 | Evans | G06F 9/441 |
| 2005/0120157 A1* | 6/2005 | Chen | G06F 13/385 710/313 |
| 2005/0149682 A1* | 7/2005 | Kim | G06F 3/0611 711/161 |
| 2005/0216481 A1 | 9/2005 | Crowther et al. | |
| 2006/0013100 A1 | 1/2006 | Ho | |
| 2006/0047946 A1 | 3/2006 | Keith, Jr. | |
| 2006/0129797 A1 | 5/2006 | Durfee et al. | |
| 2006/0174049 A1 | 8/2006 | Lin et al. | |
| 2006/0251087 A1 | 11/2006 | Ng et al. | |
| 2007/0050750 A1 | 3/2007 | Bykov et al. | |
| 2007/0101113 A1* | 5/2007 | Evans | G06F 9/4406 713/1 |
| 2007/0239861 A1 | 10/2007 | Reeves et al. | |
| 2008/0010631 A1 | 1/2008 | Harvey et al. | |
| 2008/0126773 A1 | 5/2008 | Martinez et al. | |
| 2008/0134171 A1 | 6/2008 | Matsunami et al. | |
| 2008/0141242 A1 | 6/2008 | Shapiro | |
| 2008/0189398 A1 | 8/2008 | Solyanik | |
| 2008/0256219 A1 | 10/2008 | Zhang et al. | |
| 2008/0320071 A1 | 12/2008 | Hoskins et al. | |
| 2009/0019211 A1 | 1/2009 | Bandholz et al. | |
| 2009/0063765 A1 | 3/2009 | Kottomtharayil et al. | |
| 2009/0199193 A1 | 8/2009 | Jackson | |
| 2009/0307477 A1 | 12/2009 | Matthew et al. | |
| 2009/0307763 A1 | 12/2009 | Rawlins et al. | |
| 2010/0192145 A1 | 7/2010 | Liles et al. | |
| 2011/0004872 A1 | 1/2011 | Eromenko et al. | |

OTHER PUBLICATIONS

ElTorito (CD-ROM standard), first issued in Jan. 1995 as a joint proposal by IBM and BIOS Manufacturer Phoenix Technologies, 2 pages.

Nachman, M., "Meet 'Facet,' the RealNetworks DVD Ripper Box," PCMAG.com, Apr. 28, 2009, 1 page.

TeraCart Multimedia Storage System, Blu-ray Disc, Asaca Shibasoku Corporation of America, copyright 2007, 2 pages.

Virtual CD-ROM Control Panel 2.0.11, Softpedia, Jun. 14, 2010, 2 pages.

Related U.S. Appl. No. 12/575,825, filed Oct. 8, 2009 (dated Jul. 23, 2013 as U.S. Pat. No. 8,495,626), entitled "Automated Operating System Installation."

Related U.S. Appl. No. 13/948,659, filed Jul. 23, 2013, entitled "Automated Operating System Installation."

* cited by examiner

VIRTUAL DISK CAROUSEL

CROSS-REFERENCE TO RELATED APPLICATION

This application is a continuation of U.S. patent application Ser. No. 12/814,873 by Richardson et al. that was filed on Jun. 14, 2010 and claims priority to and benefit of the earlier-filed application, which is fully incorporated by reference and made a part hereof.

BACKGROUND

Optical storage library systems allow libraries of optical disks to be accessed from a computer. Some optical storage library systems utilize a robotic mechanism for selecting the optical disk to be accessed. Other systems utilize a multitude of optical disk drives along with a computer-controlled switchbox for switching between the optical disk drives. In this type of system, the switchbox is utilized to select the optical disk drive that should be connected to the computer and to establish a connection between the selected drive and the computer.

In both previous implementations of optical storage library systems, the mechanical nature of these systems often leads to drawbacks. For instance, optical storage library systems that utilize robotic mechanisms for selecting optical disks can be large, complex, and slow to change disks. Optical storage library systems that utilize a multitude of disk drives and a switchbox can also take up a large amount of space. These types of systems might also cause a connected computer to fail to detect a connected mass storage device if the mass storage device is not presented to the computer quickly enough following a reboot of the computer.

It is with respect to these and other considerations that the disclosure presented herein has been made.

SUMMARY

A virtual disk carousel is provided herein that is capable of exposing disk images to a computer system. For instance, images of optical disks may be exposed to the computer system in order to provide the functionality of an optical storage library system, without the size and complexity of previous optical storage library systems.

According to one aspect presented herein, a computer-implemented method is described for providing an automated installation of a plurality of operating systems during a boot of at least one computer. One embodiment of the method comprises receiving, by a bridge device, a request to expose one of a plurality of operating systems stored on a virtual disk carousel to at least one computer during a boot of the at least one computer; and in response to the bridge device receiving the request for the selected operating system, the bridge device requesting the selected operating system from the virtual disk carousel, receiving the selected operating system from the virtual disk carousel in a standard disk image format, translating the selected operating system received from the virtual disk carousel in the standard disk image format to a standard mass storage device format prior to transmission to the computer and responding to the request with the selected operating system received from the virtual disk carousel by way of the standard mass storage device type exposed to the computer by the bridge device, wherein the standard mass storage device types comprise a plurality of physical optical disks.

According to another aspect presented herein, a virtual disk carousel is provided that is capable of creating disk images from optical disks. For instance, the virtual disk carousel might be equipped with an optical disk drive. The optical disk drive may be utilized to copy the contents of an optical disk to a disk image. The disk image may then be stored on a mass storage device accessible to the virtual disk carousel, such as a hard disk. The virtual disk carousel may provide sufficient storage capacity for storing many disk images.

According to another aspect, the virtual disk carousel is configured for operation with a bridge device. The bridge device is connected to the virtual disk carousel and to a computer. The bridge device is configured to expose the disk images stored at the virtual disk carousel to the computer by way of a standard storage device. For instance, the bridge device might expose a standard Universal Serial Bus ("USB") CD-ROM or DVD-ROM device to the computer. A disk image stored at the virtual disk carousel can be exposed to the computer by way of the standard storage device. In this way, the disk image appears to the computer as a physical optical disk that has been inserted into a physically connected standard CD-ROM or DVD-ROM device, even though no actual CD or DVD-ROM device is connected and no physical optical disk is present.

According to one implementation, the virtual disk carousel is configured to program the standard storage device type exposed to the computer by the bridge device. In this implementation, the type of mass storage device exposed to the computer may be determined based upon the disk image to be exposed to the computer. For instance, if the disk image is a CD-ROM disk image, then the virtual disk carousel will program the bridge device to expose a standard CD-ROM storage device to the computer. If the disk image is a DVD-ROM disk image, then the virtual disk carousel will program the bridge device to expose a standard DVD-ROM storage device to the computer.

When the computer performs read requests on the standard storage device exposed by the bridge device, the bridge device receives the requests from the computer, retrieves the appropriate portion of the disk image from the virtual disk carousel, and provides the portion of the disk image to the computer. In one embodiment, the bridge device receives portions of the disk image from the virtual disk carousel in a non-standard format. In this embodiment, the bridge device is configured to translate the portions of the disk image retrieved in the non-standard format to a standard format for transmission to the computer.

According to another aspect, the bridge device includes a first peripheral controller, such as a USB peripheral controller, configured for communicating with the virtual disk carousel, a second peripheral controller configured for communicating with the computer and for exposing the standard storage device to the computer, and a microcontroller configured to translate the portions of the disk image received from the virtual disk carousel in the non-standard format to the standard format. The bridge device might also include a display and user input controls for managing the operation of the bridge device, including providing a user interface through which a user may select the disk image to be exposed to the computer. The virtual disk carousel might also provide a user interface for managing the disk images, selecting a disk image to be exposed to the computer, and for performing other functions.

It should be appreciated that the virtual disk carousel provided herein might be utilized in various systems in addition to a standard optical library storage system. For instance, the virtual disk carousel disclosed herein may be utilized in systems for automating the installation of operating systems on a computer, systems for installing other types of software on a computer, and in systems for debugging the operation of a computer. It should be further appreciated that the above-described subject matter may also be implemented as a computing system, a computer-controlled apparatus, a computer process, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to aspects of a virtual disk carousel that may be utilized to provide a optical disk library and in other systems, such as systems for automating the installation of operating systems and other software and in systems for debugging a computer system. In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments disclosed herein.

Figure 1:
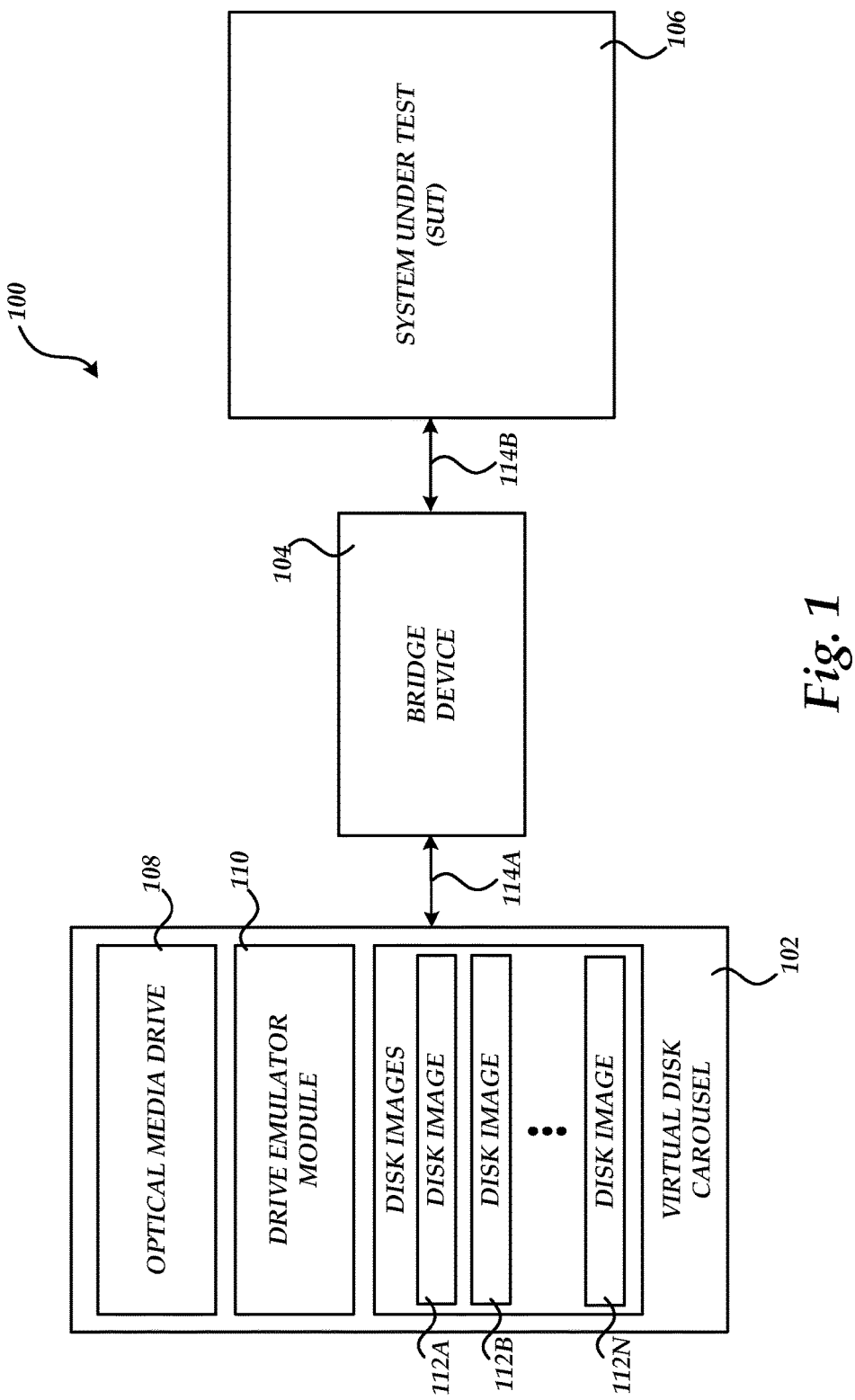
FIGS. 1-3 are system diagrams showing aspects of the configuration and use of a virtual disk carousel provided in embodiments presented herein.

FIG. 1 is a system diagram showing aspects of the configuration and use of a virtual disk carousel 102 provided in embodiments presented herein. As will be described in greater detail herein, the virtual disk carousel 102 is a computer system configured to provide much of the functionality of an optical storage library system, without the size and complexity of previous optical storage library systems. In order to provide this functionality, the virtual disk carousel 102 is equipped with an optical media drive 108. The virtual disk carousel 102 may utilize the optical media drive 108 to create disk images 112A-112N (which may be referred to herein collectively as the disk images 112 or individually as disk image 112). As known in the art, a disk image 112 is a single file containing the complete contents and structure of a data storage medium or device, such as a hard drive, tape drive, floppy disk, optical disk, or other type of device. A disk image is usually created by creating a complete sector-by-sector copy of the source medium, thereby replicating the structure and contents of a storage device.

The disk images 112 may be stored by the virtual disk carousel 102 in any one of a number of standard disk image formats, such as the ISO disk image format, or another type of proprietary format. The virtual disk carousel may provide sufficient storage capacity for storing many disk images 112. It should be appreciated that the disk images 112 might also be added to the virtual disk carousel 102 from another location or stored in another location accessible to the virtual disk carousel 102.

As illustrated in FIG. 1, the virtual disk carousel 102 is also equipped with a drive emulator module 110. The drive emulator module 110 is program code configured for execution on the virtual disk carousel 102 that operates in conjunction with a bridge device 104 to expose the disk images 112 to a computer 106. The bridge device 104 is connected to the virtual disk carousel 102 and to the computer 106. The bridge device 104 is configured to operate in conjunction with the virtual disk carousel 102 to expose the disk images 112 to the computer 106 by way of a standard storage device. For instance, the bridge device might expose a virtual standard Universal Serial Bus ("USB") CD-ROM or DVD-ROM device to the computer. A disk image 112 stored at the virtual disk carousel 102 can be exposed to the computer 106 by way of the standard storage device. In this way, the disk image 112 appears to the computer 106 as a physical optical disk that has been inserted into a physically connected standard CD-ROM or DVD-ROM device, even though no actual CD or DVD-ROM device is connected and no physical optical disk is actually present.

According to one implementation, the drive emulator module 110 includes functionality for programming the standard storage device type exposed to the computer 106 by the bridge device 104. In this implementation, the virtual disk carousel 102 may determine the type of mass storage device exposed to the computer 106 based upon the disk image 112 to be exposed to the computer 106. For instance, a header in the disk image 112 indicates that the disk image 112 is a CD-ROM disk image, then the drive emulator module 110 will program the bridge device 104 to expose a standard CD-ROM storage device to the computer 106. If the disk image 112 is a DVD-ROM disk image, then the drive emulator module 110 will program the bridge device 104 to expose a standard DVD-ROM storage device to the computer 106. The drive emulator module might also detect other types of disk images 112 and program the bridge device 104 accordingly.

When the computer 106 performs read requests on the standard storage device exposed by the bridge device 104, the bridge device 104 receives the requests from the computer 106 and retrieves the appropriate portion of the disk image 112 from the drive emulator module 110 executing on the virtual disk carousel 102. In one embodiment, the bridge device 104 receives portions of the disk image 112 from the drive emulator module 110 in a non-standard format. In this embodiment, the bridge device 104 is configured to translate the portions of the disk image 112 retrieved in the non-standard format to a standard format for transmission to the computer 106. Additional details regarding the configuration and operation of the virtual disk carousel 102 and the bridge device 104 will be provided below.

Figure 2:
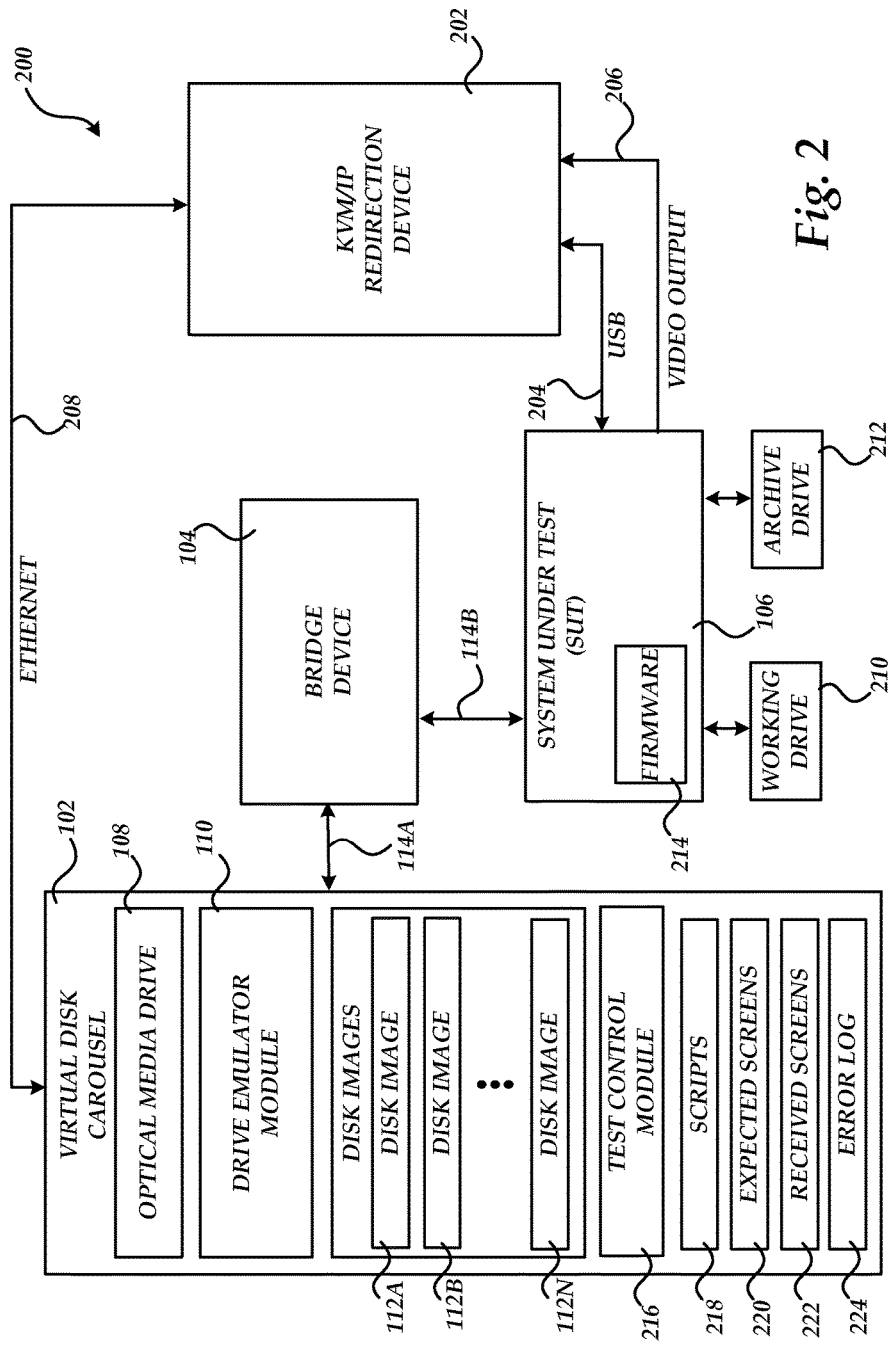

FIG. 2 is a system diagram showing aspects of the configuration and use of a virtual disk carousel 102 according to another embodiment disclosed herein. In this embodiment, the virtual disk carousel 102 is utilized in a system 200 for testing aspects of the operation of the computer 106. For instance, in this implementation, the disk images 112 may comprise images of operating system installation disks. The images 112 can be exposed to the computer 106 by the virtual disk carousel 102 and the bridge device 104 such that the operating systems can be installed on the computer 106. The installation can be monitored to determine if any occur during installation and any detected errors may be logged. This information may then be utilized, for instance, to debug the operation of a firmware 214 of the computer 106. In embodiments, the computer 106 may be referred to as a system under test ("SUT") 106. Additional details regarding this process are provided below.

In the example shown in FIG. 2, the SUT 106 is connected to a keyboard, video, mouse/internet protocol ("KVM/IP") redirection device 202. The video output 206 of the SUT 106 is also connected to the KVM/IP redirection device 202. Additionally, a connection is made between the KVM/IP redirection device 202 and the SUT 106 through which the KVM/IP redirection device 202 can send keyboard and mouse signals to the SUT 106. In one embodiment, this connection is a USB connection. It should be appreciated, however, that other types of connections, such as a PS/2 mouse and keyboard connector may be utilized. The KVM/IP redirection device 202 is also connected to the virtual disk carousel 102 through an appropriate network connection, such as the Ethernet connection 208.

The KVM/IP redirection device 202 includes functionality for capturing screen displays generated by the SUT 106, compressing the screen displays, and transmitting the screen displays ("screens") to the virtual disk carousel 102. The KVM/IP redirection device 202 also includes functionality for receiving commands from the virtual disk carousel 102 to provide keyboard or mouse input to the SUT 106. In response to receiving such instructions, the KVM/IP redirection device 202 is configured to provide the specified keyboard or mouse input to the SUT 106. In this manner, the programs described herein as executing on the virtual disk carousel 102 can receive screens 222 generated by the SUT 106 and provide keyboard and mouse input to the SUT 106. In one embodiment, the KVM/IP redirection device 202 also provides functionality for powering the SUT 106 on and off under the control of the virtual disk carousel 102. An external power controller (not shown) may also be utilized.

As briefly described above, the SUT 106 comprises a computer system that includes a firmware 214. The firmware 214 provides functionality for performing a power on self-test of the SUT 106, for performing a boot of the SUT 106, for providing interfaces to the low level operation of the SUT 106 to an operating system, and for performing other functions. Because the firmware 214 controls the low level operation of the SUT 106, it is imperative that the firmware 214 operates without program errors. A process described below for automating the installation of operating systems on the SUT 106 may be utilized to identify errors within the firmware 214. Once such errors have been identified, the firmware 214 can be modified to correct the errors. The testing process described herein may be repeated until an error-free installation has been performed.

As will be described in greater detail below, the SUT 106 may include conventional computing components, such as a central processing unit, a memory, and one or more mass storage devices. In one implementation, the SUT 106 also includes two hard disk drives. In particular, a working drive 210 is provided upon which an operating system for use in booting the SUT 106 is installed by the processes presented herein. An archive drive 212 is also provided. As will be discussed in greater detail below, the archive drive 212 is utilized to store images of the working drive 210. The images of the working drive 210 may also be utilized to debug the operation of the firmware 214. It should be appreciated that although the working drive 210 and the archive drive 212 have been discussed above as hard disk drives, other types of mass storage devices, such as solid-state mass storage devices may be utilized.

In one embodiment, the virtual disk carousel 102 controls an automated installation of an operating system on the SUT 106. In order to facilitate this process, the firmware 214 of the SUT 106 is configured to boot from an external mass storage device, such as a USB CD-ROM or a DVD-ROM drive. Once the SUT 106 has been so configured, the drive emulator module 110, operating in conjunction with the bridge device 104, causes one of the disk images 112 to be exposed to the SUT 106 as a standard mass storage device. The exposed image 112 includes an installer program for a first operating system to be installed on the SUT 106. The virtual disk carousel 102 then causes the SUT 106 to power on, such as through the use of a power controller or the KVM/IP redirection device 202. When the SUT 106 boots up, it executes the installer program for the first operating system contained on disk image 112 exposed by way of the bridge device 104. As will be discussed in greater detail below, when the SUT 106 performs read requests on the standard storage device exposed by the bridge device 104, the bridge device 104 receives the requests from the SUT 106, retrieves the appropriate portion of the disk image 112 from the virtual disk carousel 102, and provides the portion of the disk image 112 to the SUT 106.

While the SUT 106 is installing an operating system, a test control module 216 executing on the virtual disk carousel 102 receives screens 222 generated by the SUT 106 from the KVM/IP redirection device 202. The test control module 216 then compares the screens 222 received from the SUT 106 to previously stored screens 220 generated during an error-free installation of the operating system. Through this comparison process, the test control module 216 can determine if an error has occurred during installation of the operating system on the SUT 106.

If an error occurs during the installation, the test control module 216 stores data identifying the error in an error log 224. The test control module 216 may also store a screen display generated by the SUT 106 at or around the time of the error. In one implementation, the test control module 216 can also provide keystrokes to the SUT 106 to facilitate the installation of an operating system. The keystrokes may be provided to the SUT 106 through the use of the KVM/IP redirection device 202 in the manner described above. The test control module 216 may perform an analysis of the screens 222 received from the SUT 106 to determine when a particular key press should be provided to the SUT 106. In a similar fashion, the test control module 216 may provide mouse input to the SUT 106 to control the installation of an operating system.

The test control module 216 also compares screens 222 received from the SUT 106 to previously generated and stored screens 220 to determine if the installation of the operating system on the SUT 106 has completed. If the installation has completed, the test control module 216 causes the SUT 106 to power off through the use of a power controller or the KVM/IP redirection device 202. The test control module 216 then causes bridge device 104 to expose a second disk image 112 to the SUT 106. In one implementation, the selected disk image 112 contains a disk drive utility program providing functionality for erasing or formatting a mass storage device and for creating an image of the mass storage device. Once such a disk image 112 has been exposed to the SUT 106 by the bridge device 104, the test control module 216 causes the SUT 106 to power on.

When the SUT 106 powers on, it executes the disk drive utility program contained on the disk image 112 exposed by the bridge device 104. The disk drive utility program creates and stores an image of the installation of the first operating system. For instance, the disk drive utility may create an image of the working drive 210 and store the created image on the archive drive 212. The disk drive utility also formats the mass storage device upon which the first operating system was installed, such as the working drive 210, thereby preparing the mass storage device for installation of a second operating system.

When the disk utility has completed execution on the SUT 106, the test control module 216 powers off the SUT 106, programs the bridge device 104 to expose a disk image 112 containing an installer program for a second operating system to the SUT 106, and monitors the installation of the second operating system on the SUT 106 in the manner presented above. This process may then repeated for any number of operating systems, thereby allowing multiple operating system to be installed on the SUT 106 in an automated fashion. When all of the operating systems have been installed, the test control module 216 may generate an electronic mail message to an administrator that includes the error log 224 and captured screens 222 showing any errors encountered during the installation of any of the operating systems.

According to embodiments, the generated error log 224, screens 222, and images of installed operating systems stored on the archive drive 212 may be utilized to debug the operation of the firmware 214 executing on the SUT 106. For instance, bugs in the firmware 214 may be identified through an analysis of the error log 224, screens 222, and the images of the working drive 210. Once a bug has been identified, an appropriate bug fix may be applied to the firmware 214. The test described above may then be repeated on the revised firmware to determine if the problem has been resolved.

It should be appreciated that although specific types of connections have been illustrated in FIG. 2 between the various components of the system 200, other types of connections may also be utilized. For instance, USB connections 114A-114B have been illustrated between the bridge device 104, the virtual disk carousel 102, and the SUT 106. It should be appreciated that other types of wired or wireless connections suitable for connecting a mass storage device to a computing system may be utilized. Similarly, other types of appropriate interfaces for connecting a mass storage device to a computing system may be for connecting the SUT 106 to the working drive 210 and the archive drive 212. It should be appreciated that the embodiments described herein are not limited by the particular interfaces described herein with respect to any embodiment.

According to one embodiment, the test control module 216 utilizes scripts 218 that are configured to provide the functionality presented herein for automating the process of installing an operating system on the SUT 106. It should be appreciated that although the embodiments presented herein utilize scripts 218, virtually any type of executable computer program may be configured for providing the functionality described herein. For instance, a standard application program may be programmed for execution on the virtual disk carousel 102 that provides the functionality described herein.

It should also be appreciated that the test control module 216, the scripts 218, the expected screens 220, the received screens 222, and the error log 224 may be stored and executed at a computer system other than the virtual disk carousel 102. In such an embodiment, the virtual disk carousel 102 and the bridge device 104 may be utilized to expose the disk images 112 to the SUT 106 in the manner described above, while another computer system or systems execute the test control module 216 for automating the installation of the operating systems and controlling the operation of the SUT 106. Other configurations may also be utilized.

Figure 3:
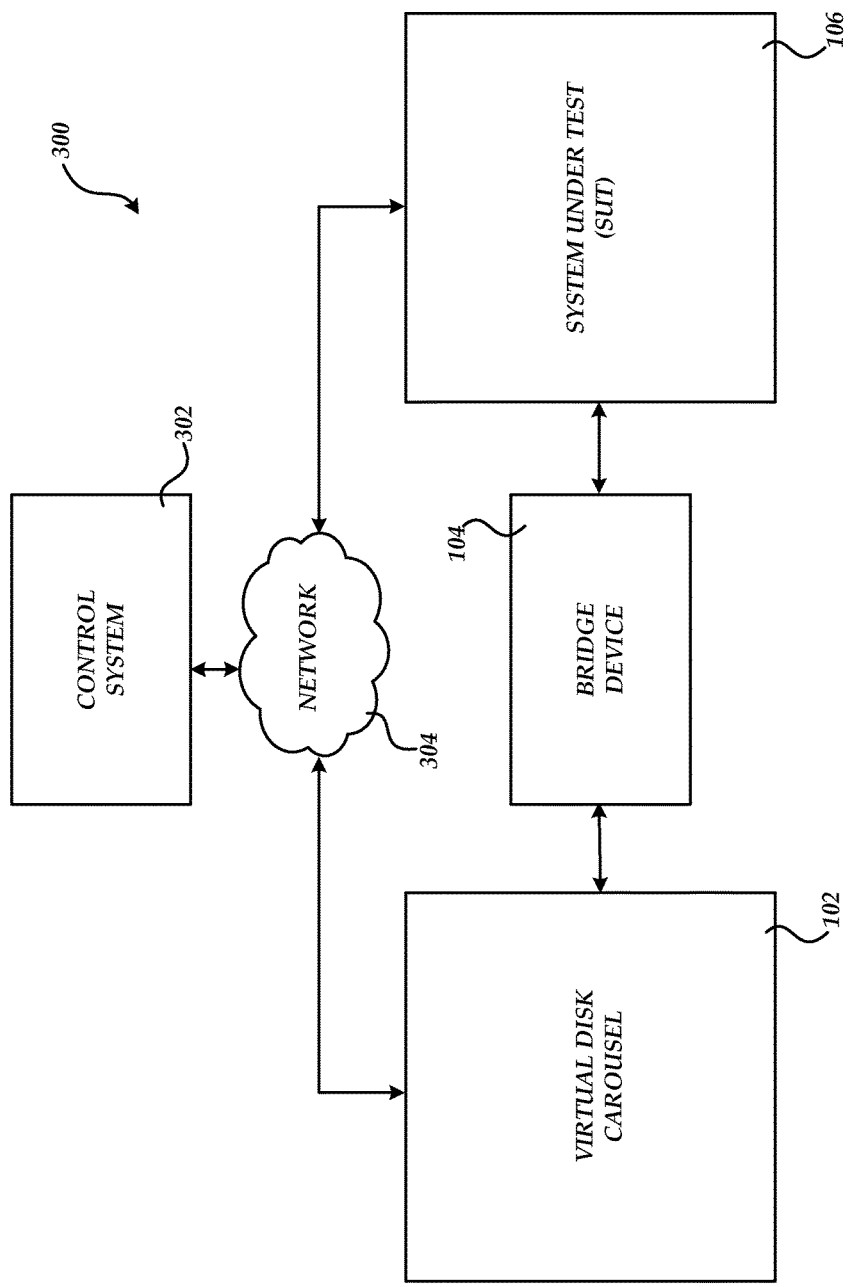

FIG. 3 is a system diagram showing additional aspects of the configuration and use of a virtual disk carousel 102 in one embodiment. In the implementation shown in FIG. 3, the virtual disk carousel 102 includes a suitable network interface for connecting to the network 304. The network 304 may be a local area network ("LAN") or a wide area network ("WAN"), such as the Internet.

In the example shown in FIG. 3, a control system 302 is also provided. The control system 302 is a computer system that is also connected to the network 304 and that provides suitable functionality for establishing a connection to the virtual disk carousel 102 over the network 304. Through the connection, the control system 302 can control the operation of the virtual disk carousel 102, including selecting the disk image 112 to be exposed to the SUT 106 by the bridge device 104, managing the disk images 112, and performing other functions relating to the management of the virtual disk carousel 102.

As shown in FIG. 3, the control system 302 can also establish a network connection to the SUT 106. Through this connection, the operator of the control system 302 can remotely control the operation of the SUT 106. In this way, the operator of the control system 302 can remotely control the operation of the virtual disk carousel 102 and the SUT 106. For instance, the operator might remotely install software contained on the disk images 112 on the SUT 106 or perform other functions. This may be useful, for instance, for installing software on a SUT 106 that is not equipped with an optical mass storage device. Although not illustrated in FIG. 3, the bridge device 104 might also be configured with a network interface for connecting to the network 304 and for enabling remote configuration and control of the bridge device 104 by an operator of the control system 302.

Figure 4:
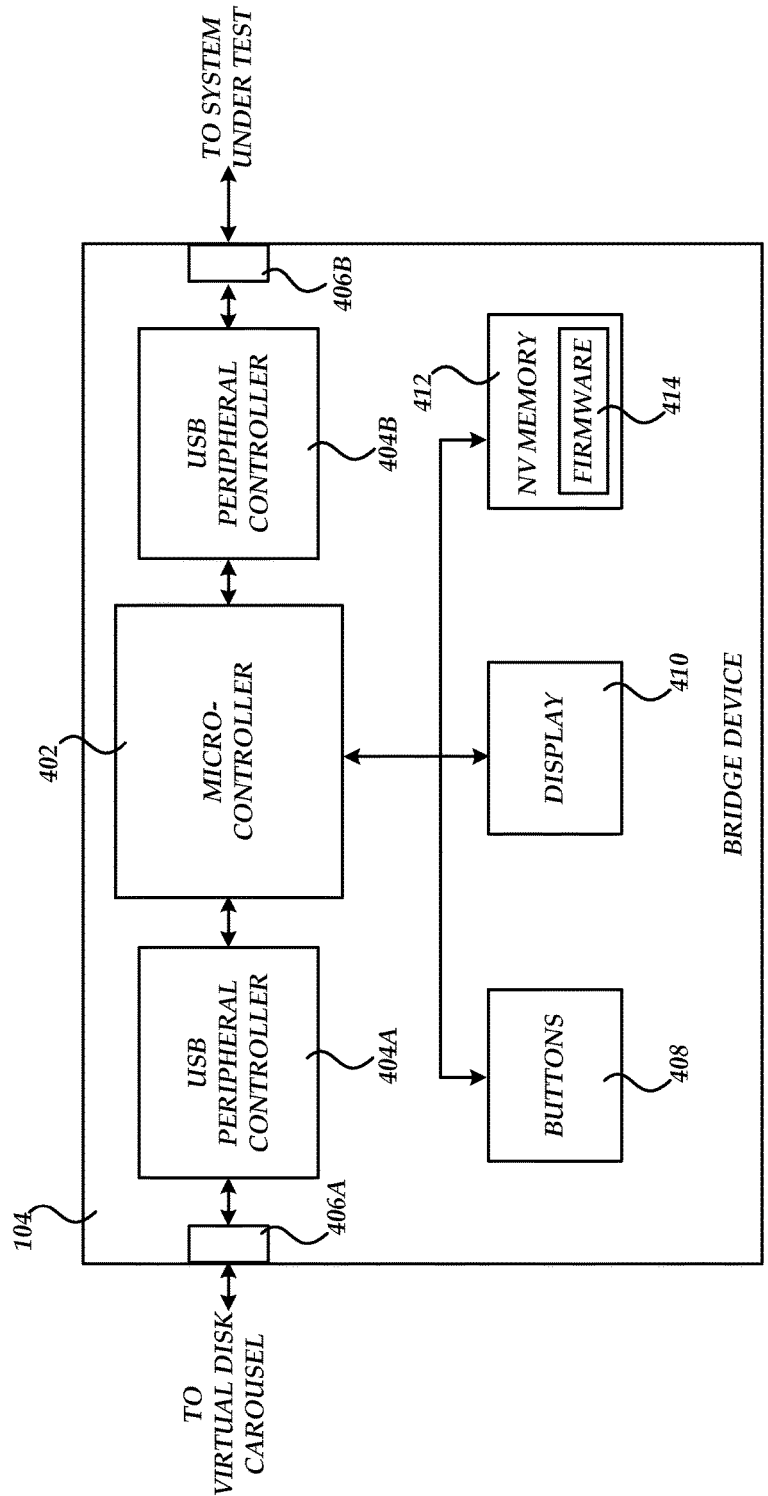
FIG. 4 is a simplified schematic diagram showing aspects of the configuration of a bridge device provided in one embodiment disclosed herein.

FIG. 4 is a simplified schematic diagram showing aspects of the configuration of a bridge device 104 provided in one embodiment disclosed herein. In the illustrated embodiment, the bridge device 104 includes a USB peripheral controller 404A configured for communicating with the virtual disk carousel 102. An appropriate connector 406A might be provided for connecting a cable to the bridge device 104. As shown in FIG. 4, this implementation also includes a USB peripheral controller 404B configured for communicating with the computer 106. An appropriate connector 406B might be provided for connecting a cable to the computer 106.

In the implementation shown in FIG. 4, the bridge device 104 also includes a microcontroller 402. The microcontroller 402 is configured control the overall operation of the bridge device 402, including exposing a standard mass storage device to the computer 106, receiving requests from the computer 106 by way of the USB peripheral controller 404B for a portion of a disk image 112, passing such requests to the virtual disk carousel 102, receiving requested portions of the disk image 112 from the virtual disk carousel 102, and for providing the requested portions of the disk image 112 to the computer 106. The microcontroller 402 executes a firmware 414 stored in a non-volatile memory 412 connected to the microcontroller 414 to provide this functionality.

Figure 5:
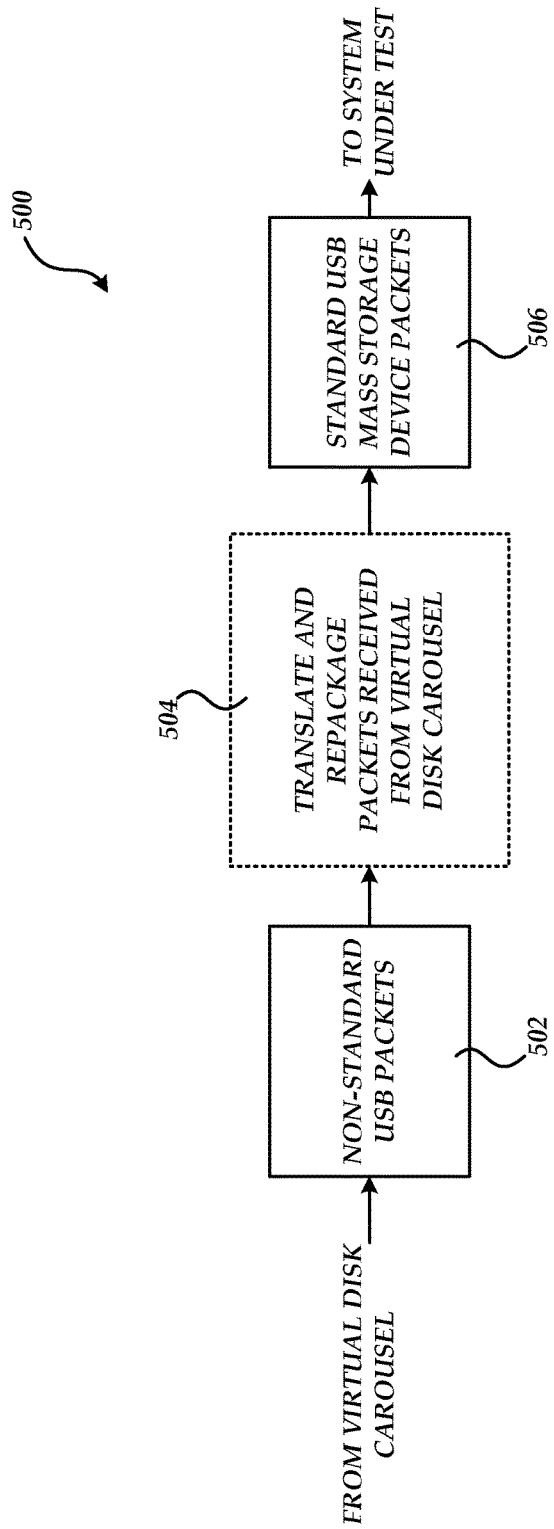
FIG. 5 is a flow diagram showing aspects of the operation of a bridge device provided in one embodiment disclosed herein.

In one embodiment, the bridge device 104 receives portions of the disk image 112 from the virtual disk carousel 102 in a non-standard format. For instance, a proprietary format might be utilized. In this embodiment, the microcontroller 402 is configured to translate the portions of the disk image 112 retrieved in the non-standard format to a standard format for transmission to the computer 106. This process is illustrated in FIG. 5. As shown in FIG. 5, non-standard packets 502 are received from the virtual disk carousel 102. The bridge device 104 then translates and repackages the non-standard packets 502 to create the standard USB mass storage device packets 506. The bridge device 104 then transmits the standard USB mass storage device packets 506 to the computer 106.

According to embodiments, the bridge device 402 might also include a display 410 and user input controls, such as the buttons 408, for managing the operation of the bridge device 104. For instance, the display 410 might be utilized to provide a user interface through which a user may select the disk image 112 to be exposed to the computer 106 by the bridge device 104. As discussed above, the virtual disk carousel 102 might also provide a user interface for managing the disk images 112, selecting a disk image 112 to be exposed to the computer 106, and for performing other functions. Additional details regarding the operation of the bridge device will be provided below with respect to FIG. 5.

Figure 6:
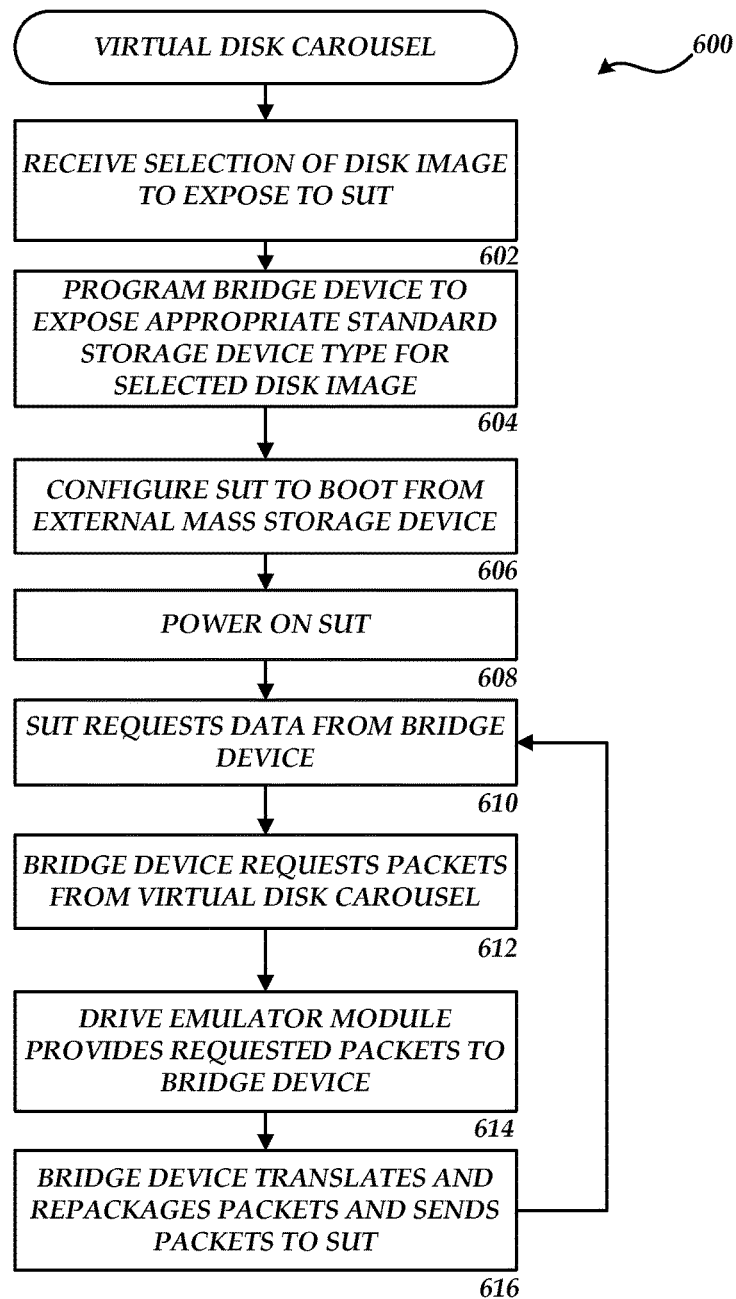
FIG. 6 is a flow diagram showing aspects of the operation of a virtual disk carousel provided in one embodiment presented herein.

FIG. 6 is a flow diagram showing aspects of a routine 600 that illustrates the operation of the virtual disk carousel 102 in one embodiment. It should be appreciated that the logical operations described herein with respect to the various figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof.

It should also be appreciated that more or fewer operations may be performed than shown in the figures and described herein. These operations may also be performed in a different order than those described herein.

The routine 600 begins at operation 602, where the selection of the disk image 112 to be exposed to the computer 106 is received. As discussed above, the virtual disk carousel 102 provides a user interface in one embodiment through which a user can select the image 112 to be exposed to the computer 106. The bridge device 104 might also provide such a user interface. Once the disk image 112 to be exposed to the computer 106 has been selected, the routine 600 proceeds from operation 602 to operation 604.

At operation 604, the virtual disk carousel 102 programs the standard storage device type to be exposed to the computer 106 by the bridge device 104. In this implementation, the type of mass storage device exposed to the computer 106 may be determined based upon a header in the disk image 112 to be exposed to the computer 106. For instance, if the disk image is a CD-ROM disk image, then the virtual disk carousel 102 will program the bridge device 104 to expose a standard CD-ROM storage device to the computer 106. If the disk image is a DVD-ROM disk image, then the virtual disk carousel 102 will program the bridge device 104 to expose a standard DVD-ROM storage device to the computer 106. In response to such programming, the bridge device 104 exposes the specified mass storage device type to the computer 106 by way of the peripheral controller 404B.

From operation 604, the routine 600 proceeds to operation 606, where the computer 106 is configured to boot from the mass storage device exposed by the virtual disk carousel 102 and the bridge device 104. As discussed above, the computer 106 might be configured manually or under the operation of a test control module 216 executing on the virtual disk carousel 102 or another computer system. Once the computer 106 has been configured to boot from the mass storage device exposed by the virtual disk carousel 102, the routine 600 proceeds from operation 606 to operation 608.

At operation 608, the computer 106 is powered on. The routine 600 then proceeds to operation 610, where the computer 106 requests data from the mass storage device exposed by the bridge device 104. In response to such a request, the routine 600 proceeds to operation 612, where the bridge device 104 requests the appropriate portion of the disk image 112 from the virtual disk carousel 102. In response thereto, the drive emulator module 110 reads the portion of the disk image 112 from disk and provides the portion to the bridge device 104. As discussed above, the portions of the disk image 112 provided by the drive emulator module 110 to the bridge device 104 might be provided in a non-standard format.

From operation 614, the routine 600 proceeds to operation 616, where the bridge device responds to the request from the computer 106. If the virtual disk carousel 102 returns the portion of the disk image 112 in a non-standard format, the bridge device 104 translates and repackages the data into a standard mass storage device format in the manner described above. The routine 600 then returns to operation 610, described above, where additional requests from the computer 106 are processed in a similar manner.

Figure 7A:
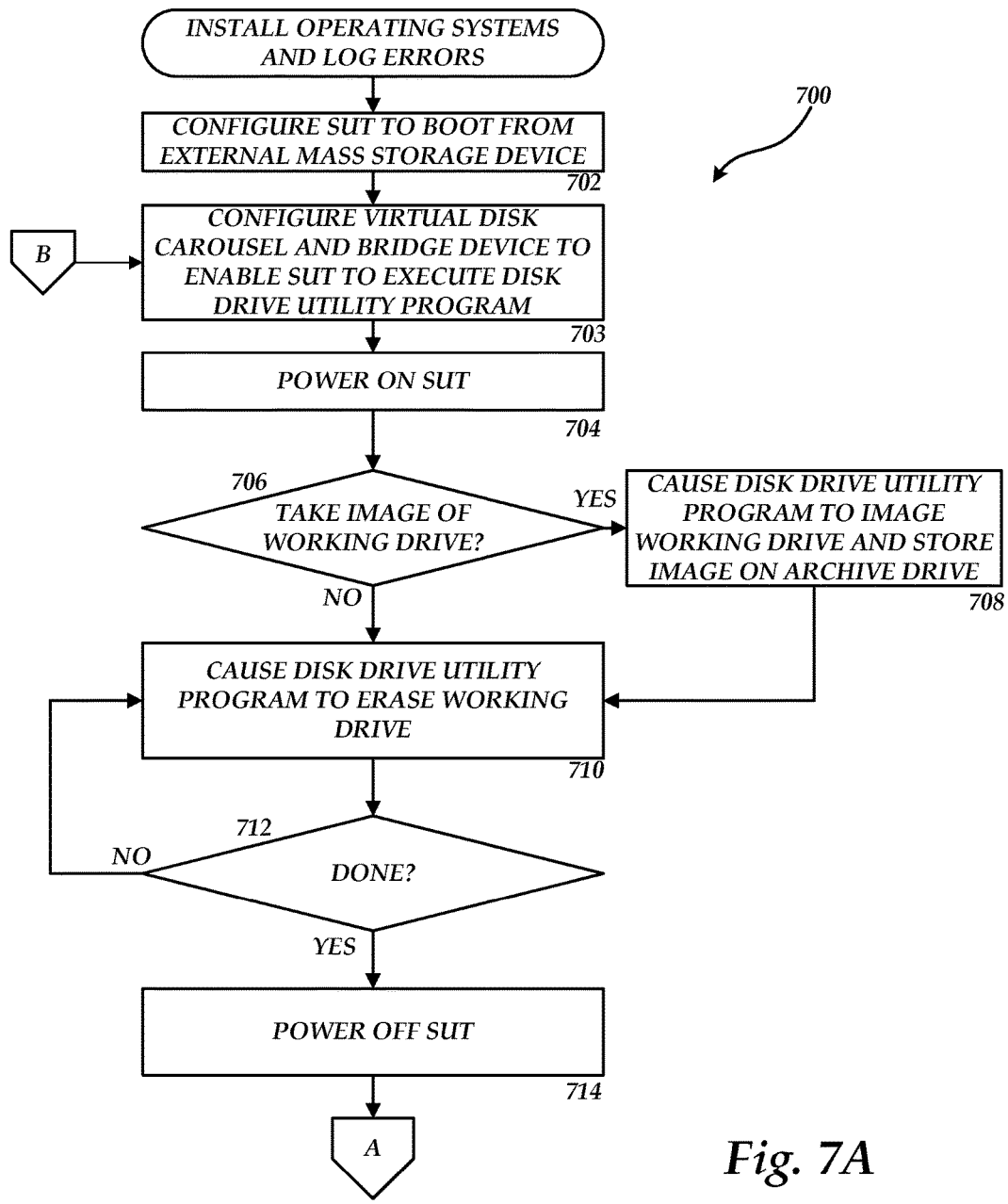
FIGS. 7A-7B are flow diagrams illustrating aspects of a method for the automated installation of an operating system utilizing a virtual disk carousel in one embodiment disclosed herein.
Figure 7B:
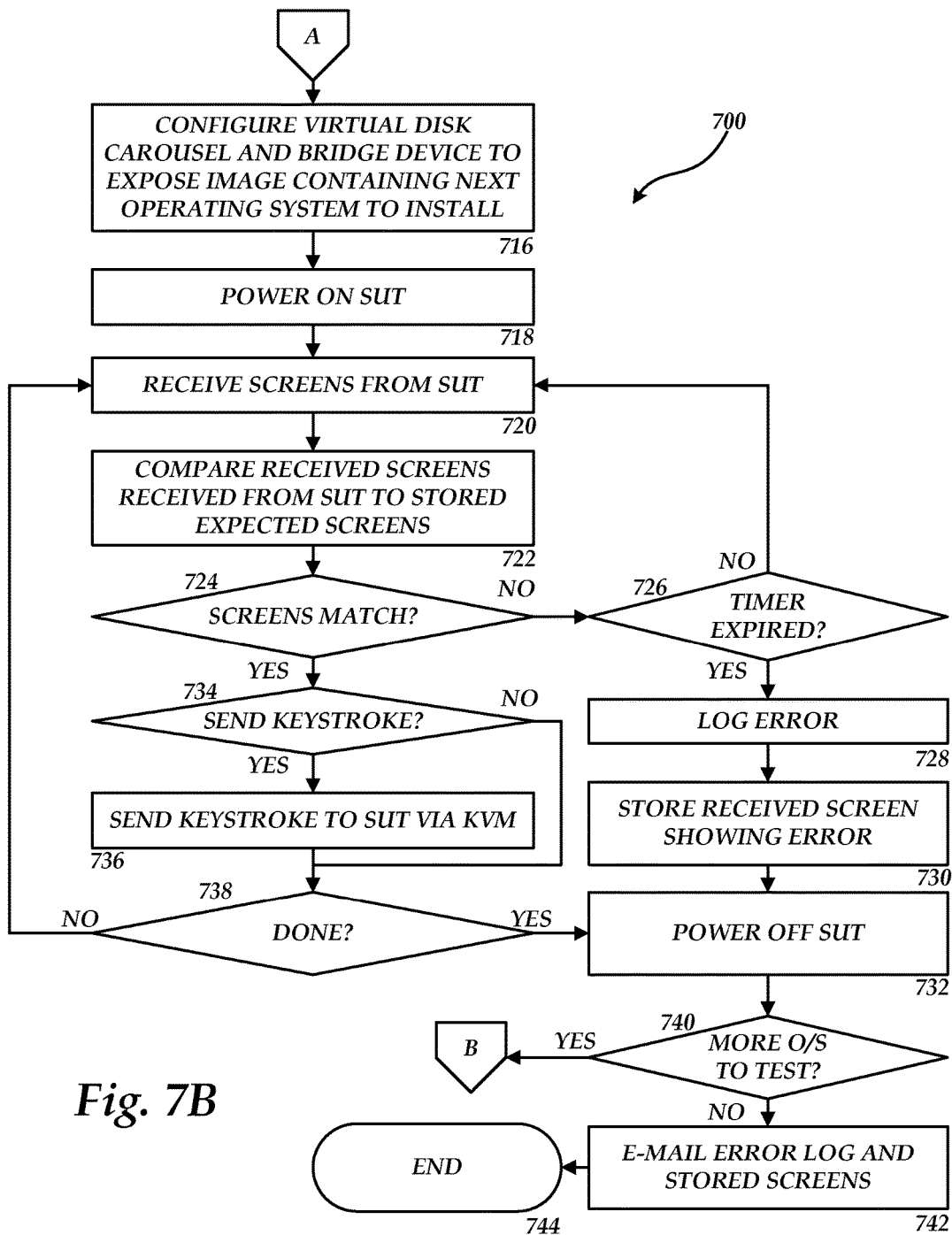

FIGS. 7A-7B are flow diagrams illustrating aspects of one routine 700 for the automated installation of an operating system utilizing a virtual disk carousel 102 in one embodiment disclosed herein. The routine 700 begins at operation 702, where the SUT 106 is configured to boot from the mass storage device exposed by the bridge device 104. From operation 702, the routine 700 process to operation 703, where the virtual disk carousel 102 configures the bridge device 104 to enable the SUT 106 to execute a disk drive utility program stored on one of the disk images 112. In this regard, the virtual disk carousel 102 may configure the bridge device 104 to expose a disk image 112 containing a disk drive utility program to the SUT 106. As discussed above, the disk drive utility program includes functionality for formatting and imaging mass storage devices, like hard drives.

Once the bridge device 104 has been configured to expose the image 112 containing the disk drive utility to the SUT 106, the routine 700 proceeds to operation 704 wherein the virtual disk carousel 102 powers on the SUT 106. As discussed above, the virtual disk carousel 102 may utilize a power controller or the KVM/IP redirection device 114 to power on the SUT 106. In response to being powered on, the SUT 106 boots from the virtual mass storage device exposed by the bridge device 104 (i.e. a virtual optical disk having the contents of the disk image 112 containing the disk drive utility).

When the disk drive utility is booted and executed by the SUT 106, the disk drive utility determines whether it should take an image of the working drive 210. An image of the working drive 210 should be taken following the installation of each of the operating systems to be tested with the SUT 106. In this regard, if an image is to be taken of the working drive 210, the routine 700 proceeds from operation 706 to operation 708. At operation 708, the disk drive utility program prepares an image of the working drive 210 and stores the image on the archive drive 212. From operation 708, the routine 700 proceeds to operation 710.

If at operation 706, it is determined that it is unnecessary to take an image of the working drive 210, the routine 700 proceeds from operation 706 to operation 710. At operation 710, the disk drive utility program executing on the SUT 106 erases the working drive 210. For instance, in one embodiment, the disk drive utility may erase the master boot record ("MBR") on the working drive 210 in order to prepare the working drive 210 for the installation of another operating system. Once the working drive 210 has been prepared for installation of the next operating system, the routine 700 proceeds from operation 712, to operation 714.

At operation 714, the virtual disk carousel 102 powers off the SUT 106 utilizing a power controller or the KVM/IP redirection device 114. The routine 700 then proceeds from operation 714 to operation 716 where the virtual disk carousel 102 configures the bridge device 104 to expose an image 112 to the SUT 106 that contains the next operating system to be installed on the SUT 106. According to one implementation, the bridge device 104 simulates the ejection of the virtual optical disk exposed to the SUT 106. The bridge device 104 then simulates the insertion of an optical disk having the contents of the image 112 that contains the next operating system to be installed on the SUT 106. In this manner, no physical disconnect is made of the virtual standard mass storage device exposed by the bridge device 104. From the perspective of the SUT 106, it appears only that a disk has been ejected and another disk has been inserted.

The routine 700 then proceeds to operation 718 where the virtual disk carousel 102 causes the SUT 106 to be powered on. When the SUT 106 is powered on, it will begin installing the operating system installer program from the mass storage device exposed by the bridge device 104 and begin the process of installing the second operating system on the SUT 106. During the installation of the operating system, the KVM/IP redirection device 202 will receive screens from the SUT 106 and transmit the screens to the virtual disk carousel 102. The virtual disk carousel 102 receives the screens from the KVM/IP redirection device 114 at operation 720. From operation 720, the routine 700 proceeds to operation 722 where the test control module 216 executing on the virtual disk carousel 102 compares the screens 222 received from the KVM/IP redirection device 114 to the expected screens 220.

At operation 724, a determination is made if the expected screens 220 match the received screens 222. If not, the routine 700 proceeds to operation 726, where the test control module 216 executing on the virtual disk carousel 102 determines whether a timer has expired. If not, the routine 700 returns to operation 720 where an additional determination is made. The use of a timer in this manner allows the virtual disk carousel 102 to wait a predetermined period of time before concluding that an error has occurred during the installation of an operating system on the SUT 106. This can be utilized to account for timing differences in the speed at which an operating system may be installed on different systems having varying levels of performance.

If the timer has expired at operation 726, the routine 700 proceeds to operation 728 where the test control module 216 executing on the virtual disk carousel 102 makes a record of the error in the error log 224 in the manner described above. The routine 700 then proceeds to operation 730 where the test control module 216 executing on the virtual disk carousel 102 stores the received screen 222 showing the error in the installation of the operating system on the SUT 106.

If, at operation 724, the scripts 218 determine that the expected screens 220 match the received screens 222, the routine 700 proceeds from operation 724 to operation 734. At operation 734, the scripts 218 determine whether one or more keystrokes should be sent to the SUT 106 in order to facilitate the installation of the operating system on the SUT 106. If no keystrokes are to be sent to the SUT 106, the routine 700 proceeds from operation 734 to operation 738. If keystrokes are to be sent to the SUT 106, the routine 700 proceeds from operation 734 to operation 736 where the test control module 216 sends the appropriate keystrokes to the KVM/IP redirection device 202 for provision to the SUT 106. It should be appreciated that the keystrokes to be sent to the SUT 106 may be determined through an analysis of an error-free installation of an operating system on the SUT 106. It should also be appreciated that mouse input may be transmitted to the SUT 106 in a similar manner to facilitate installation of an operating system on the SUT 106.

From operation 736, the routine 700 proceeds to operation 738 where the scripts 218 determine whether the installation of the operating system on the SUT 106 has completed. This may be accomplished, for instance, by comparing the expected screens 220 to the received screens 222 to determine whether the installation has completed. For instance, the expected screens 220 may show a final screen in an operating system installation, such as an operating system desktop. If the received screens 222 match such an expected screen 220, the routine 700 proceeds from operation 738 to operation 732. If the operating system installation has not completed, the routine 700 proceeds from operation 738 to operation 720, described above.

At operation 732, the test control module 216 executing on the virtual disk carousel 102 causes the SUT 106 to be powered off. The routine 700 then proceeds to operation 740 where the scripts 218 determine whether additional operating systems remain to be installed on the SUT 106. If so, the routine 700 proceeds to operation 703, described above for the installation of additional operating systems. If no additional operating systems remain to be installed, the routine 700 proceeds from operation 740 to operation 742.

At operation 742, the scripts 18 cause the virtual disk carousel 102 to email the error log 224 and any stored screens showing errors during the installation of operating systems on the SUT 106 to a system administrator. As discussed above, the virtual disk carousel 102 may also make the error log 224 and the screens showing installation errors available to an administrator in another fashion. From operation 742, the routine 700 proceeds to operation 744, where it ends.

It should be appreciated that, according to embodiments, the scripts 218 may be configured to flash the firmware 214 as part of the operating system installation process described above. For instance, if errors are encountered during the installation of an operating system on the SUT 106, the scripts 218 may cause a different version of the firmware 214 to be installed on the SUT 106. The scripts 218 may then attempt another installation of the same operating system under SUT 106. In this manner, different versions of the firmware 214 can be tested with an installation of the same or different operating systems.

Figure 8:
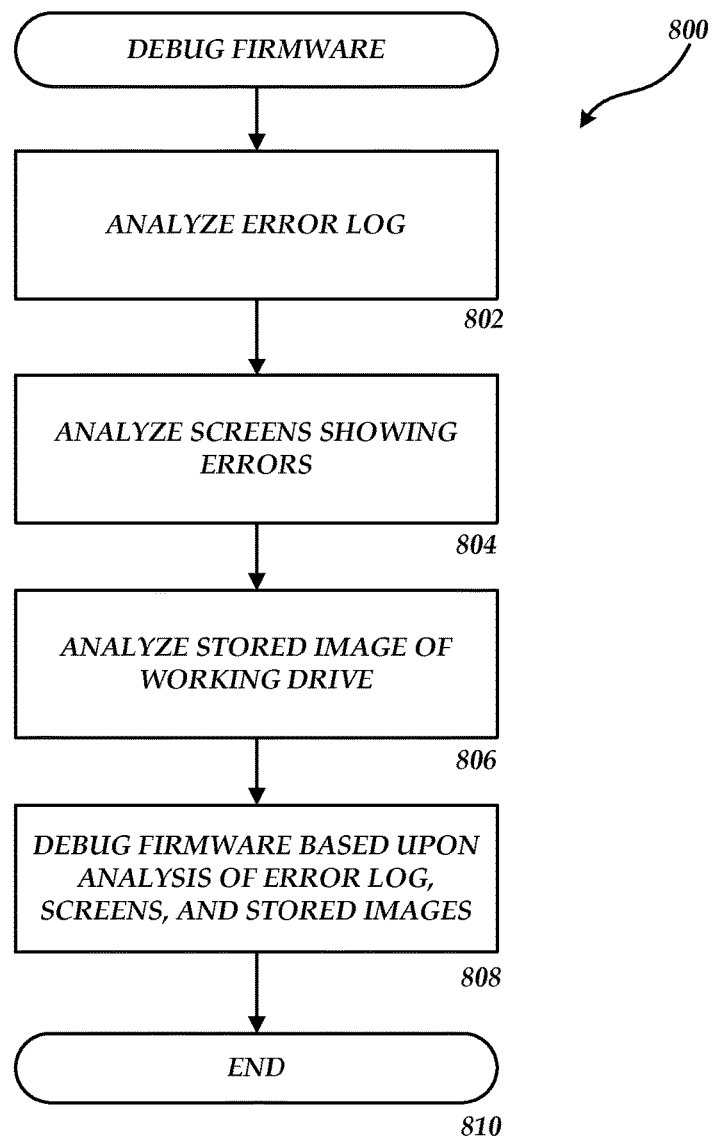
FIG. 8 is a flow diagram showing one method for debugging a firmware provided in one embodiment disclosed herein.

FIG. 8 is a flow diagram showing aspects of a routine 800 presented herein in one embodiment for debugging the operation of a computing system firmware 214 that utilizes automated operating system installation through the use of a virtual disk carousel 102. The routine 800 begins at operation 802, where the error log 224 is analyzed to identify errors within the firmware 214. The routine then proceeds to operation 804, where the screens captured by the KVM/IP redirection device 202 at or around the time of an error during the installation of an operating system on the SUT 106 are also analyzed in attempt to identify errors within the firmware 214.

From operation 804, the routine 800 proceeds to operation 806, where the stored images of the operating system installations stored on the archive drive 212 are analyzed in attempt to identify errors within the firmware 214. If errors are identified at any of the operations 802, 804, or 806, described above, the routine 800 proceeds to operation 808 where the firmware 214 is modified in an attempt to eliminate the error within the firmware 214. As discussed briefly above, the processes described above for automated operating system installation may be repeated following a modification of the firmware 214 in order to determine whether the identified error has been eliminated from the firmware 214. From operation 808, the routine 800 proceeds to operation 810, where it ends.

Figure 9:
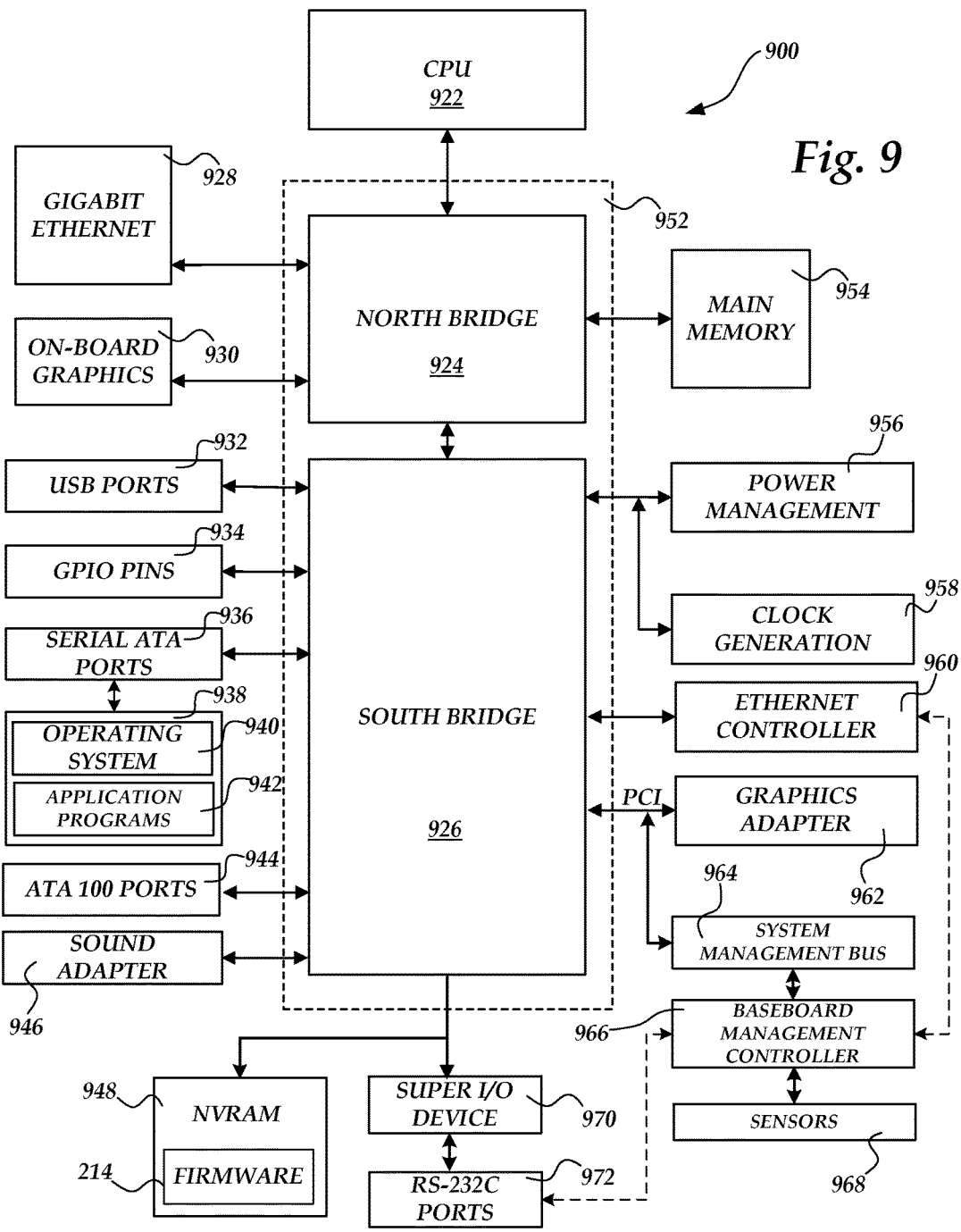
FIG. 9 is a computer architecture diagram showing an illustrative computer architecture that might be utilized to implement the various computing systems presented herein.

FIG. 9 is a computer architecture diagram showing an illustrative computer architecture that might be utilized to implement the various computing systems presented herein. FIG. 9 and the following discussion are intended to provide a brief, general description of one suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, scripts, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

As discussed briefly above, FIG. 9 shows an illustrative computer architecture that may be utilized to embody the various computing systems described herein. It should be appreciated that the computer architecture shown in FIG. 9 may be utilized to embody the virtual disk carousel 102 or the SUT 106. The illustrative computer architecture shown in FIG. 9 is for a computer 900 that includes a baseboard, or "motherboard", which is a printed circuit board to which a multitude of components or devices may be connected by way of a system bus or other electrical communication path. In one illustrative embodiment, a CPU 922 operates in conjunction with a chipset 952. The CPU 922 is a central processor that performs arithmetic and logical operations necessary for the operation of the computer. The computer 900 may include a multitude of CPUs 922.

The chipset 952 includes a north bridge 924 and a south bridge 926. The north bridge 924 provides an interface between the CPU 922 and the remainder of the computer 900. The north bridge 924 also provides an interface to a random access memory ("RAM") used as the main memory 954 in the computer 900 and, possibly, to an on-board graphics adapter 930. The north bridge 924 may also include functionality for providing networking functionality through a gigabit Ethernet adapter 928. The gigabit Ethernet adapter 928 is capable of connecting the computer 900 to another computer via a network. Connections that may be made by the network adapter 928 may include LAN or WAN connections. LAN and WAN networking environments are commonplace in offices, enterprise-wide computer networks, intranets, and the Internet. The north bridge 924 is connected to the south bridge 926.

The south bridge 926 is responsible for controlling many of the input/output functions of the computer 900. In particular, the south bridge 926 may provide one or more universal serial bus ("USB") ports 932, a sound adapter 946, an Ethernet controller 960, and one or more general-purpose input/output ("GPIO") pins 934. The south bridge 926 may also provide a bus for interfacing peripheral card devices such as a graphics adapter 962. In one embodiment, the bus comprises a peripheral component interconnect ("PCI") bus. The south bridge 926 may also provide a system management bus 964 for use in managing the various components of the computer 900. Additional details regarding the operation of the system management bus 964 and its connected components are provided below.

The south bridge 926 is also configured to provide one or more interfaces for connecting mass storage devices to the computer 900. For instance, according to an embodiment, the south bridge 926 includes a serial advanced technology attachment ("SATA") adapter for providing one or more serial ATA ports 936 and an ATA 100 adapter for providing one or more ATA 100 ports 944. The serial ATA ports 936 and the ATA 100 ports 944 may be, in turn, connected to one or more mass storage devices storing an operating system 940 and application programs 942, such as the SATA disk drive 938. As known to those skilled in the art, an operating system 940 comprises a set of programs that control operations of a computer and allocation of resources. An application program is software that runs on top of the operating system software, or other runtime environment, and uses computer resources to perform application specific tasks desired by the user.

The mass storage devices connected to the south bridge 926, and their associated computer-readable media, provide non-volatile storage for the computer 900. Although the description of computer-readable media contained herein refers to a mass storage device, such as a hard disk or CD-ROM drive, it should be appreciated by those skilled in the art that computer-readable media can be any available media that can be accessed by the computer 900. By way of example, and not limitation, computer-readable media includes volatile and non-volatile, removable and non-removable media implemented in any method or technology for storage of information such as computer-readable instructions, data structures, program modules or other data. For instance, computer-readable media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 900.

A low pin count ("LPC") interface may also be provided by the south bridge 926 for connecting a "Super I/O" device 970. The Super I/O device 970 is responsible for providing a number of input/output ports, including a keyboard port, a mouse port, a serial interface 972, a parallel port, and other types of input/output ports. The LPC interface may also connect a computer-readable media such as a ROM or a flash memory such as the NVRAM 948 for storing a firmware 214 that includes program code containing the basic routines that help to start up the computer 900 and for transferring information between elements within the computer 900.

As described briefly above, the south bridge 926 may include a system management bus 964. The system management bus 964 may include a baseboard management controller ("BMC") 966. In general, the BMC 966 is a microcontroller that monitors operation of the computer system 900. In a more specific embodiment, the BMC 966 monitors health-related aspects associated with the computer system 900, such as, but not limited to, the temperature of one or more components of the computer system 900, speed of rotational components (e.g., spindle motor, CPU Fan, etc.) within the system, the voltage across or applied to one or more components within the system 900, and the available or used capacity of memory devices within the system 900. To accomplish these monitoring functions, the BMC 966 is communicatively connected to one or more components by way of the management bus 964. In an embodiment, these components include sensor devices for measuring various operating and performance-related parameters within the computer system 900.

The management bus 964 is used by the BMC 966 to request and/or receive various operating and performance-related parameters from one or more components, which are also communicatively connected to the management bus 964. For instance, in one embodiment, the management bus 964 may communicatively connect the BMC 966 to a CPU temperature sensor and a CPU fan (not shown in FIG. 9), thereby providing a means for the BMC 966 to monitor and/or control operation of these components. The BMC 966 may also include sensors 968 connected directly thereto.

The serial ports 972 and the Ethernet controller 960 may be utilized to establish a connection with the BMC 966. Through the use of the BMC 966, the sensors 968, and the system management bus 964, the computer 900 may collect the management data 112 discussed above and make this data available to requesting programs. The BMC 966 may also provide functionality for setting aspects of the management data 112 as discussed above, such as for instance resetting the computer 900 or setting the power state of the computer 900.

It should be appreciated that the software components described herein may, when loaded into the CPU 922 and executed, transform the CPU 922 and the overall computer 900 from a general-purpose computing system into a special-purpose computing system customized to facilitate the functionality presented herein. The CPU 922 may be constructed from any number of transistors or other discrete circuit elements, which may individually or collectively assume any number of states. More specifically, the CPU 922 may operate as a finite-state machine, in response to executable instructions contained within the software modules disclosed herein. These computer-executable instructions may transform the CPU 922 by specifying how the CPU 922 transitions between states, thereby transforming the transistors or other discrete hardware elements constituting the CPU 922.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 900 in order to store and execute the software components presented herein. It also should be appreciated that the computer 900 may comprise other types of computing devices, including hand-held computers, embedded computer systems, personal digital assistants, and other types of computing devices known to those skilled in the art. It is also contemplated that the computer 900 may not include all of the components shown in FIG. 9, may include other components that are not explicitly shown in FIG. 9, or may utilize an architecture completely different than that shown in FIG. 9.

Based on the foregoing, it should be appreciated that concepts and technologies for providing a virtual disk carousel have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing an automated installation of a plurality of operating systems during a boot of at least one computer, the method comprising performing computer-implemented operations for:
   receiving, by a bridge device, a request to expose one of a plurality of operating systems stored on a virtual disk carousel to at least one computer during a boot of the at least one computer, wherein the at least one computer is connected to the bridge device by a single first USB port and the bridge device is connected to the virtual disk carousel by a single second USB port; and
   in response to the bridge device receiving the request for the selected operating system, the bridge device requesting the selected operating system from the virtual disk carousel through the single second USB port, the bridge device receiving the selected operating system from the virtual disk carousel in a standard disk image format through the single second USB port, the bridge device translating the selected operating system received from the virtual disk carousel in the standard disk image format to one of a plurality of standard mass storage device formats prior to transmission to the computer, wherein the selected standard mass storage device format is identified to the bridge device in a header in a disk image of the selected operating system, and the bridge device responding to the request with the selected operating system received from the virtual disk carousel by way of the selected standard mass storage device format exposed to the computer by the bridge device through the single first USB port.

2. The computer-implemented method of claim 1, wherein the bridge device comprises a first peripheral controller configured for communicating with the virtual disk carousel.

3. The computer-implemented method of claim 2, wherein the bridge device further comprises a second peripheral controller configured for communicating with the computer and for exposing the standard mass storage device format to the computer.

4. The computer-implemented method of claim 2, wherein the bridge device further comprises a microcontroller.

5. The computer-implemented method of claim 1, wherein the bridge device is configured to provide a user interface for selecting the one of the plurality of operating systems to be exposed to the computer.

6. The computer-implemented method of claim 1, wherein the virtual disk carousel is configured to provide a user interface for selecting the one of the plurality of operating systems to be exposed to the computer.

7. The computer-implemented method of claim 1, wherein the standard mass storage device format is selected from the group consisting of a CD-ROM storage device or a DVD-ROM storage device.

8. A system for providing an automated installation of a plurality of operating systems during a boot of at least one computer, the system comprising:
   a first device comprising a virtual disk carousel comprising a drive emulator module;
   a second device comprising at least one computer; and
   a third device comprising a bridge device, wherein the at least one computer is connected to the bridge device by a single first USB port and the bridge device is connected to the virtual disk carousel by a single second USB port and wherein said bridge device includes a microcontroller and a memory in communication with the microcontroller, the memory having computer-executable instructions stored therein that, when executed by the microcontroller, cause the microcontroller to:
   receive a request to expose one of a plurality of operating systems stored on the virtual disk carousel to the at least one computer during a boot of the at least one computer; and
   in response to receiving the request for the selected operating system, the microcontroller requesting the selected operating system from the virtual disk carousel through the single second USB port, the microcontroller receiving the selected operating system from the virtual disk carousel in a standard disk image format through the single second USB port, the microcontroller translating the selected operating system received from the virtual disk carousel in the standard disk image format to one of a plurality of standard mass storage device formats prior to transmission to the computer, wherein the selected standard mass storage device format is identified to the microcontroller in a header in a disk image of the selected operating system, and the microcontroller responding to the request with the selected operating system received from the virtual disk carousel by way of the selected standard mass storage device format exposed to the computer by the bridge device through the single first USB port.

9. The system of claim 8, wherein the bridge device comprises a first peripheral controller configured for communicating with the virtual disk carousel.

10. The system of claim 9, wherein the bridge device further comprises a second peripheral controller configured for communicating with the computer and for exposing the standard mass storage device format to the computer.

11. The system of claim 8, wherein the virtual disk carousel is configured to provide a user interface for selecting the one of the plurality of operating systems to be exposed to the computer.

12. The system of claim 8, wherein the portions of the operating system received by the bridge device comprise packets in a standard disk image format, and the bridge device is further configured to translate and repackage the packets in the standard disk image format to the standard mass storage device format.

13. The system of claim 8, wherein the standard mass storage device format is selected from the group consisting of a CD-ROM storage device or a DVD-ROM storage device.

14. An apparatus for providing an automated installation of a plurality of operating systems during a boot of at least one computer, the apparatus comprising:
   a first peripheral controller configured for communicating with a virtual disk carousel through a single second USB port;
   a second peripheral controller configured for communicating with the computer through a single first USB port and for exposing a standard mass storage device to the computer through the single first USB port as one of a plurality of standard mass storage device formats;
   a microcontroller; and
   a memory in communication with the microcontroller, the memory having computer-executable instructions stored therein that, when executed by the microcontroller, cause the microcontroller to receive a request from the computer through the single first USB port for at least a portion of one of a plurality of operating systems stored at the virtual disk carousel, cause the microcontroller to request the portion of an operating system from the virtual disk carousel by way of the first peripheral controller through the single second USB port, cause the microcontroller to receive the portion of the operating system from the virtual disk carousel in a standard disk image format through the single second USB port, cause the microcontroller to translate the portion of the operating system received from the virtual disk carousel from the standard disk image format to a selected standard mass storage device format and to provide the portion of an operating system in the selected standard mass storage device format to the computer by way of the second peripheral controller through the single first USB port in response to the request, wherein the selected standard mass storage device format is identified to the microcontroller in a header in a disk image of the selected portion of the operating system.

15. The apparatus of claim 14, wherein the standard mass storage device format is selected from the group consisting of a CD-ROM storage device or a DVD-ROM storage device.

* * * * *